United States Patent Office 3,319,545
Patented May 16, 1967

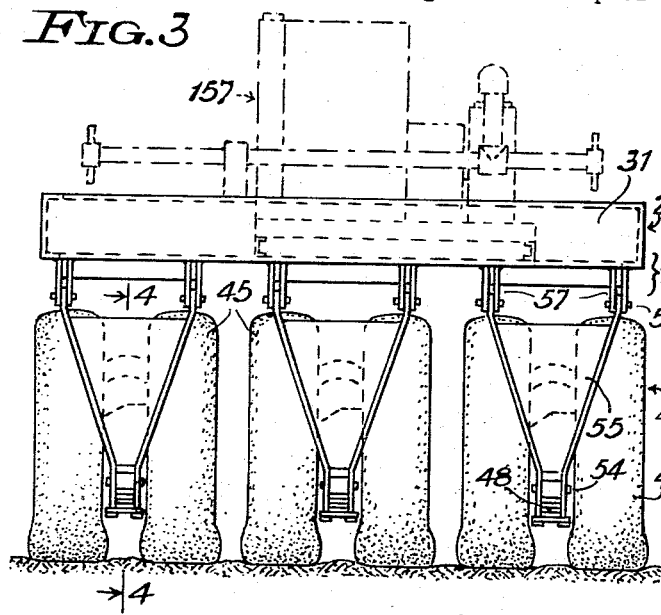
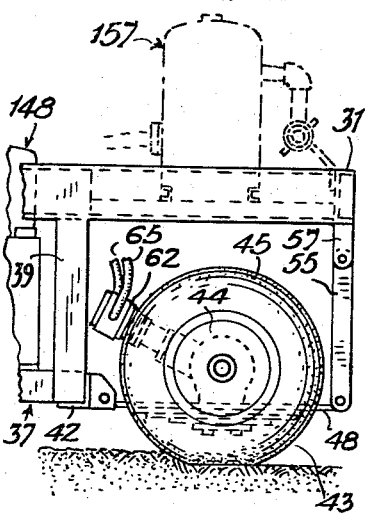

3,319,545
VEHICLE HAVING DUAL-WHEEL
TRACTION UNITS
Harry J. Seaman, Milwaukee, Wis.; Ann Seaman and American City Bank & Trust Company, executors of Harry J. Seaman, deceased, assignors to Seaman Corporation, a corporation of Wisconsin
Original application Apr. 22, 1963, Ser. No. 274,621, now Patent No. 3,224,347, dated Dec. 21, 1965. Divided and this application Oct. 18, 1965, Ser. No. 497,318
7 Claims. (Cl. 94—50)

The present invention relates to wheeled vehicles and more particularly to vehicles having dual-wheeled traction units. This application constitutes a division of my copending application for Soil Processing Machines, Serial No. 274,621, filed April 22, 1963, now U.S. Patent No. 3,224,347.

An object of the invention is to provide a wheeled vehicle suitable for heavy duty applications, such as earth working and road building, including improved dual-wheel traction units which are adapted to support heavy loads and are also adapted to form a compaction roll of the vehicle.

Another object is to provide a wheeled vehicle of this character in which each dual-wheel traction unit includes a hydraulic driving motor carried thereby.

A further object is to provide a wheeled vehicle in which the driving motor of each traction unit is to be arranged as to permit relatively close lateral spacing of the dual wheels of the unit and to provide mechanical protection for the motor.

The invention further consists in the several features hereinafter described and claimed.

In the accompanying drawing,

FIG. 1 is a fragmentary side elevational view of the rear portion of a hydraulically driven wheeled vehicle embodying the invention;

FIG. 2 is a fragmentary top plan view of the rear portion of the vehicle, parts being broken away;

FIG. 3 is a rear elevational view of the vehicle;

FIG. 4 is a detail sectional elevational view taken generally on the line 4—4 of FIG. 3, showing a hydraulically driven traction unit of the machine;

FIG. 5 is a detail sectional view taken generally on the line 5—5 of FIG. 4, and FIG. 6 is a diagrammatic view of a hydraulic driving system for the wheel units of the rear compaction roll.

In the drawing, the numeral 16 designates a wheeled vehicle, such as the tractor-drawn trailer unit of a soil processing machine of the type disclosed in the above-identified application. The vehicle comprises a frame 29 including spaced parallel channel side beams 30 rigidly connected at their rear ends by a channel cross beam 31. The vehicle frame further includes a subframe 37 which laterally bridges the frame at a region spaced forwardly of the rear end of the frame and includes rear vertical members 39 projecting downwardly from the side beams 30 and connected at their lower ends to stringers 40 and a rear cross member 42.

The rear portion of the vehicle frame is supported by a ground-engaging compaction roll 43 which comprises a plurality of at least three pairs of transversely aligned laterally spaced wheels 44 with respective pneumatic tires 45. The wheels in each pair are carried on the opposite ends of a horizontal axle shaft 46, FIGS. 4 and 5, mounted in a housing 47 disposed between the spaced wheels, thus forming a dual-wheel unit or assembly. Each housing is rigidly secured at its lower side to resilient torque resisting supporting means, such as to the middle portion of a laminated leaf spring 48 extending longitudinally of the vehicle frame, the spring being seated in a channel 49 formed in the underside of the housing and clamped in position by means such as a bottom clamping plate 50 secured to the housing by stud bolts 51. The front end of each leaf spring is detachably pivotally secured by a pin 52 to a bracket 53 fixed to the rear cross member 42 of the sub-frame 37. The rear end of each leaf spring is pivotally secured by a pin 54 to the lower end of an upwardly divergent shackle arm 55, and the upper end of the shackle arm is pivotally secured at 56 to laterally spaced ears 57 fixed to the underside of the rear cross beam 31 of the vehicle frame.

In the present instance, each shaft housing 47 forms a drive gear housing, the associated axle shaft 46 being journalled in opposite end portions of the housing and having its opposite ends keyed to the associated pair of wheels 44. The axle shaft 46 has keyed thereto a bevel gear 58 which meshes with a bevel pinion 59 carried on a drive shaft 60. The drive shaft extends in a narrow housing extension 61 which is disposed in a generally radial direction between the pneumatic-tired wheels 44 and is inclined forwardly and upwardly, as best seen in FIG. 4, the housing extension forming a cantilever arm. The front or free end of each arm-forming housing extension is disposed adjacent to the tire peripheries and rigidly carries a hydraulic motor 62 which is connected to the drive shaft, preferably through a clutch 63, such as an over-running clutch. The several hydraulic motors are supplied with oil under pressure from a suitably driven hydraulic pump 64, as hereinafter described, the several wheel motors being connected to the pump through a conduit system 65 which may include a valve 66, as indicated in FIG. 6. The conduit system includes flexible portions leading to the motors, so as to permit deflection of the roll-forming wheels and the gear housings.

The several individually sprung wheel pairs are capable of a limited lateral tilting action under the torsional restraint of the associated leaf springs 48. The roll-forming vehicle-supporting wheels 44 may revolve idly during road-rolling operation of the machine and during road transport, or they may be power-driven by the hydraulic motors 62 to increase the tractive action on the machine, or to provide the entire tractive effort. The leaf springs resist the driving torque on the axle shafts. The position of each hydraulic motor 62 on the elevated forward end of the inclined arm forming gear housing extension 61 protects the motor from injury. Each hydraulic motor projects outwardly from the tire peripheries a reasonably short distance, thus avoiding excessive overhang and displacement of the motor-carrying outer end of the narrow arm-forming gear housing extension 61. The gear housing 47, however has an axial length considerably greater than the limited lateral spacing between the dual tires, as seen in FIG. 5.

The hydraulic pump for operating the hydraulic wheel motors 62 is driven by any suitable source of power. By way of example, the pump is here shown to be driven by the internal combustion engine 149, FIG. 2, of a power unit 148 which is mounted on the vehicle sub-frame 37. In the case of an articulated vehicle with a tractor unit, the pump may be driven by the tractor engine.

In a vehicle which forms an earth-working machine, such as the soil processing machine disclosed in the above-identified application, the rear portion of the vehicle frame may have mounted thereon a pump-driving engine unit 157. This will also form ballast for the roll-forming tires.

When the vehicle is used as a road roller, pulverized and mixed road bed material is compacted and kneaded by the rubber-tired compacting roll 43, the roll also providing a sealing action on the road bed. In normal road-rolling operation, the roll-forming wheels preferably rotate idly, but when required these wheels can be driven by the hydraulic motors.

During the road-rolling operation, and also during road transport and off-road travel of the vehicle, the spring-mounted dual-wheel units have a limited freedom to deflect both vertically and in a laterally tilting direction under the restraint of the leaf springs. Each dual-wheel motor-carrying dual-wheel unit is individually deflectable as a whole, the hydraulic motor being rigidly supported on the free end of the arm-forming gear housing extension 61. This construction avoids the need for supporting the hydraulic motors on the vehicle frame and simplifies the construction.

What is claimed is:

1. In an earth working machine, a vehicle including pneumatic-tired supporting wheels forming a compacting roll, said wheels being arranged in a plurality of axially aligned pairs, a gear housing between at least one pair of said wheels with an axle shaft secured to said wheels, resilient torque resisting means between said gear housing and vehicle maintaining said gear housing in proper attitude relative to said vehicle, said gear housing including an extension between said adjacent wheels, a drive shaft in said extension having a gearing connection with said axle shaft, and a hydraulic motor coupled to said drive shaft.

2. In an earth working machine, a vehicle including pneumatic-tired supporting wheels forming a compaction roll, said wheels being arranged in a plurality of axially aligned pairs, a gear housing between at least one pair of said wheels with an axle shaft secured to said wheels, resilient torque resisting means between said gear housing and vehicle maintaining said gear housing in proper attitude relative to said vehicle, said gear housing including an extension between said adjacent wheels, a drive shaft in said extension having a gearing connection with said axle shaft, a hydraulic motor coupled to said drive shaft, and a clutch connecting said motor and drive shaft.

3. In an earth working machine, a vehicle including pneumatic-tired supporting wheels forming a compaction roll, said wheels being arranged in a plurality of axially aligned pairs, a gear housing between at least one pair of said wheels with an axle shaft secured to said wheels, resilient torque resisting means between said gear housing and vehicle maintaining said gear housing in proper attitude relative to said vehicle, said gear housing including an extension between said adjacent wheels, a drive shaft in said extension having a gearing connection with said axle shaft, a hydraulic motor coupled to said drive shaft, and an overrunning clutch connecting said motor and drive shaft.

4. A dual-wheel traction unit for a vehicle having a frame, comprising a pair of pneumatic-tired laterally spaced coaxial wheels, an axle shaft drivingly connecting said wheels, a gear housing disposed between said wheels and in which said shaft is journalled, a torque-resisting leaf spring extending between said pair of wheels at right angles to said shaft, means for connecting the gear housing to the spring, means for mounting said leaf spring to the vehicle frame, and a hydraulic motor carried by said gear housing and having a driving connection with said axle shaft.

5. A dual-wheel traction unit for a vehicle having a frame, comprising a pair of pneumatic-tired laterally spaced coaxial wheels, an axle shaft drivingly connecting said wheels, a gear housing disposed between said wheels and in which said shaft is journalled, resilient torque-resisting supporting means for connecting said gear housing to said frame, said gear housing having a generally radial portion projecting between said spaced wheels in laterally adjacent relation thereto and forming a cantilever arm, and a hydraulic motor mounted and supported on the outer end of said arm and having a driving connection with said axle shaft through said radial housing portion.

6. A dual-wheel traction unit as defined in claim 5, wherein the arm-forming gear housing extension projects angularly upwardly from the axis of the drive shaft.

7. A dual-wheel traction unit for a vehicle having a frame, comprising a pair of laterally spaced pneumatic-tired coaxial wheels, a gear housing disposed between said wheels, an axle shaft drivingly secured to said wheels and journalled in said housing, resilient supporting means connecting said gear housing to said frame and maintaining said gear housing in proper relation to said vehicle, said gear housing including an extension disposed between said wheels in laterally adjacent relation to said wheels, a drive shaft in said extension having a gearing connection with the axle shaft, and a hydraulic motor supported solely by the outer end portion of said gear housing extension and coupled to said drive shaft.

References Cited by the Examiner

UNITED STATES PATENTS

| | | | |
|---|---|---|---|
| 1,914,266 | 6/1933 | Leupold | 180—22 |
| 2,477,925 | 8/1949 | Gentry | 180—22 |

JACOB L. NACKENOFF, *Primary Examiner.*